United States Patent

Wallace

[11] Patent Number: 5,087,061
[45] Date of Patent: Feb. 11, 1992

[54] WHEELBARROW-TRAILER IMPLEMENT

[76] Inventor: Astor J. Wallace, 1301 W. Robinson St., Harrisburg, Ill. 62946

[21] Appl. No.: 624,714

[22] Filed: Dec. 3, 1990

[51] Int. Cl.$^5$ ............................................. B62B 1/04
[52] U.S. Cl. .................................. 280/30; 280/47.31; 280/47.315; 280/653; 280/656
[58] Field of Search .............. 280/653, 656, 30, 47.31, 280/491.5, 47.33, 47.315, 655.1

[56] References Cited

U.S. PATENT DOCUMENTS

| | | | |
|---|---|---|---|
| 3,403,924 | 10/1968 | Oliveira | 280/656 |
| 4,738,457 | 4/1988 | Conrad | 280/47.315 |
| 4,740,008 | 4/1988 | Johnson | 280/47.33 |
| 4,789,171 | 12/1988 | Porter | 280/47.18 |
| 4,962,833 | 10/1990 | McCurdy | 280/47.31 |

FOREIGN PATENT DOCUMENTS 434718 4/1948 Italy ................................. 280/653

*Primary Examiner*—Andres Kashnikow
*Assistant Examiner*—Eric Culbreth
*Attorney, Agent, or Firm*—Don W. Weber

[57] ABSTRACT

A wheelbarrow which may be readily converted to a garden trailer is presented. The wheelbarrow comprises an upper pan for carrying materials. The upper pan is connected to lower non-parallel base rails which serve as the base and handles for the upper pan. Attached beneath the base rails are a pair of wheels. The wheels are seperated from the base rails by seperating plates and the pan is separated from the base rails by a wedge. The converging ends of the base rail have a dumping base plate attached. A mainframe tow bar is attached to the housing of the axle between the two wheels. When it is desired to convert the wheelbarrow to a trailer, a tow bar extender is easily fastened to the mainframe tow bar and the handles are folded back underneath the pan. In dumping material from the pan, the wheelbarrow may be easily turned on its base plate and the entire contents of the pan dumped. This dumping is facilitated by the separation of the pan and wheels from the base rail by the separating plates and wedge. The tow bar extender is conveniently attached to the base rail when the device is being used as a wheelbarrow.

5 Claims, 2 Drawing Sheets

WHEELBARROW-TRAILER IMPLEMENT

BACKGROUND OF THE INVENTION

Wheelbarrows and other garden vehicles are well known throughout the United States. They consist generally of an upper pan or container for storing and transporting material, lower diverging handles, and one or more wheels. The one-wheeled vehicles are generally less stable than are the two-wheeled carts.

It has been known in this particular field to make a wheelbarrow which may also serve as a trailer to be pulled by a tractor. One method of doing this is to provide a dolly or other small sets of wheels upon which the wheelbarrow can ride when the dolly is connected to the tractor or riding lawn mower. Yet another method was disclosed in the 1988 patent issued to Porter, U.S. Pat. No. 4,789,171.

The Porter device disclosed a multi-purpose wheelbarrow which could be converted to a trailer by completely removing the arms, re-attaching them in a different configuration and attaching the now convergent arms to a universal insert member which would then be connected to the tractor or riding lawn mower. However, the Porter device had a number of drawbacks in that a number of separate parts and a cumbersome interchange of the supporting arms was required to convert the wheelbarrow to a garden trailer.

The instant device enables the gardener to convert his wheelbarrow to a trailer by means of permanently affixed hinged handle extenders and an easily attached tow bar extender.

SUMMARY OF THE INVENTION

The instant invention comprises several new improvements in the wheelbarrow art so that the conversion from wheelbarrow to trailer and vice versa can be accomplished in an efficient and simple manner. Additionally, the unique construction of the wheelbarrow and bottom supporting members enables the gardener to dump the material in the wheelbarrow by using an end plate.

The instant wheelbarrow comprises an upper pan which may be of varying size. The upper pan is connected to a pair of non-parallel base rails by means of an essentially triangular shaped wedge. A pair of wheels are attached to the base rails by means of separating plates which separate the axle for the wheels from the base rails. (These separating plates are critical since they allow the dumping of the wheelbarrow without further hinged mechanisms or other devices.) When it is desired to convert the wheelbarrow to a trailer, the base rail extending arms are simply folded back upon the main base rails and secured thereto by a suitable bracket. Attached to the axle is a mainframe tow bar which can be extended beyond the dimensions of the upper pan by quickly and easily attaching a tow bar extension. The trailer may then be conveniently attached to the tractor or riding lawn mower. When not in use the tow bar extension is detachably connected to one of the base rails.

It is an object of this invention to provide a wheelbarrow which may be conveniently and quickly converted into a garden trailer. It is a further object of this invention to provide a wheelbarrow which may be easily converted into a trailer by means of readily available and conveniently attached parts. It is a further object of this invention to provide a wheelbarrow which may be emptied without the necessity for hinging the upper pan by means of tipping the wheelbarrow onto a base plate.

It is a further object of this invention to provide a wheelbarrow which may be converted to a trailer and yet conveniently stored in a very small space. Other and further objects of this invention will become apparent upon reading the following Specification herein.

DETAILED DESCRIPTION OF THE PREFERRED EMBODIMENT

Figure 1:
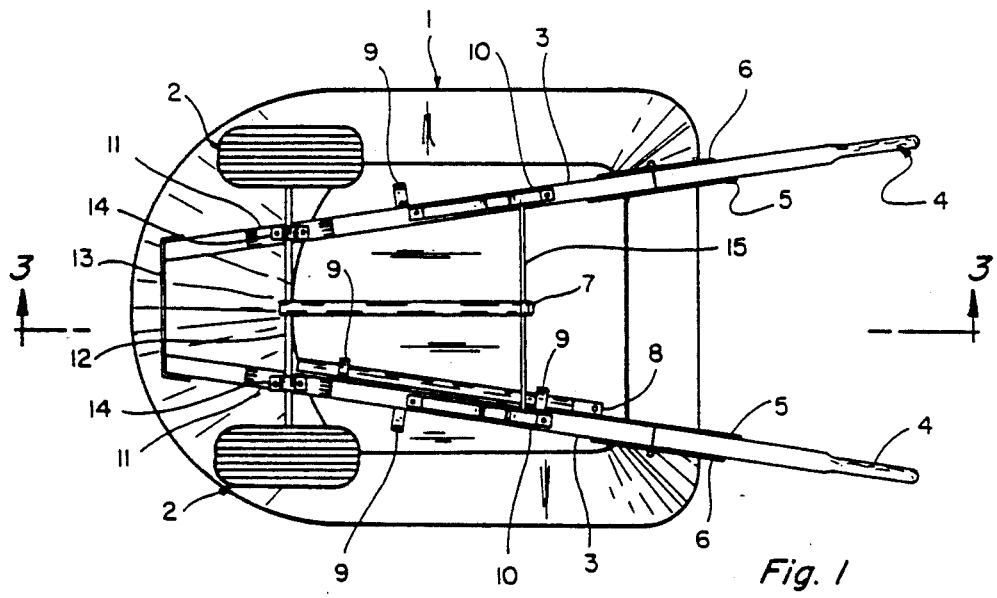
FIG. 1 is a bottom view of the wheelbarrow/trailer device having the arms in the extended position.
Figure 2:
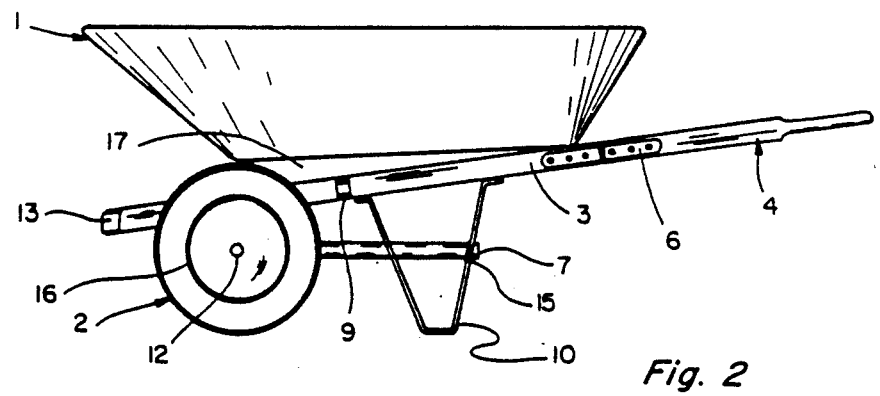
FIG. 2 is a side view of the wheelbarrow with the arms extended.

The wheelbarrow/trailer of the instant invention comprises an upper pan 1 and lower supporting members. The wheelbarrow pan 1, as best shown in FIGS. 1 and 2, is connected to the lower base rails 3 by a base rail wedge 17. The pan 1, wedge 17 and base rails 3 may be connected to each other by any convenient means including nails, bolts, or glue. The base rail wedge 17 raises the pitch of the pan so that it may be fully and conveniently dumped when used in conjunction with the end plate described below.

The wheelbarrow device is designed to be a two-wheeled vehicle, having tires 2 mounted on metal wheels 16. The wheels 16 are connected by an axle 12.

Figure 3:
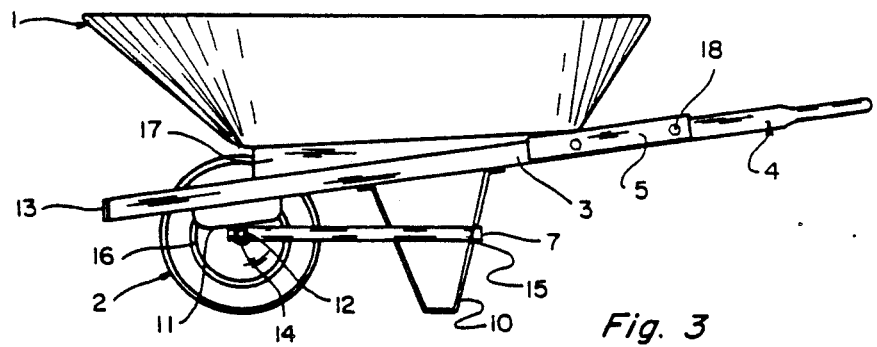
FIG. 3 is a cut-away view of the wheelbarrow shown along lines 3—3 in FIG. 1.
Figure 6:
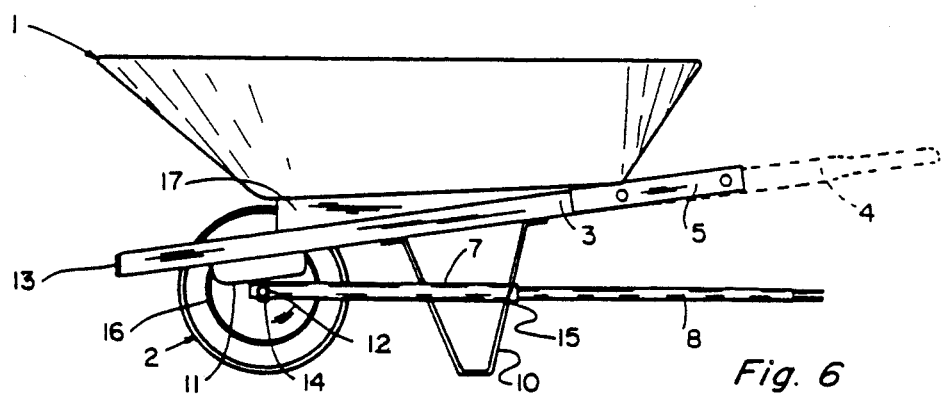
FIG. 6 is a sectional view of the wheelbarrow with the arms in the retracted position shown along lines 6—6 of FIG. 4.
Figure 5:
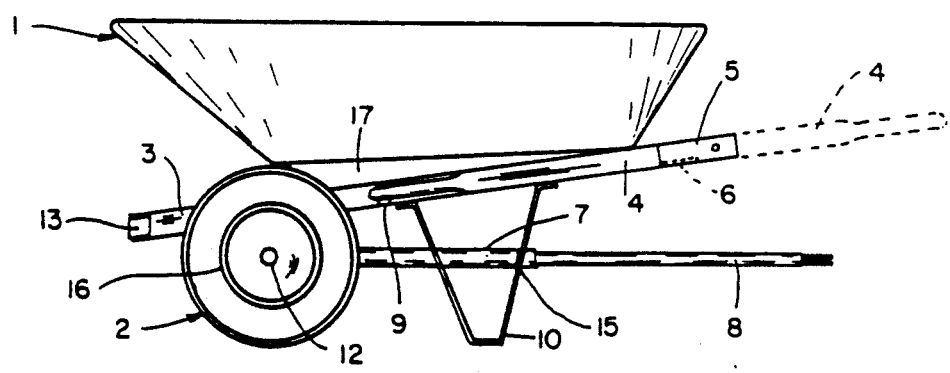
FIG. 5 is a side view of the wheelbarrow device shown with the arms in the retracted position and with the tow bar extension attached to the mainframe tow bar.

The mainframe of the wheelbarrow/trailer is made up of non-parallel base rails 3 which diverge towards the workman's end and converge toward the dumping end. The main base rails 3 are connected at their converging end by a wheelbarrow base plate 13. The main base rails, at their diverging end, have hinged extension handles 4, as best shown on FIGS. 1 and 2. These extension handles are permanently but hingedly attached to the main base rails 3 by means of a metal hinge 6, as best shown on FIG. 2. In order to maintain the strength of the handles when they are extended, an inner L-shaped brace 5 is attached to the inside of each base rail, as best shown in FIGS. 3 and 6. When the extension handles 4 are in their extended position, as shown in FIGS. 2 and 3, they may be secured to the L-shaped braces 5 by means of bolts 18.

Attached to the bottom of the main base rails 3 are a pair of stationary legs 10. These stationary legs may take any shape but are shown in the preferred embodiment as a modified "V". The wheels are connected by an axle 12 which is in turn connected to a pair of axle separating plates 11, as shown on FIG. 3. This axle separating plate 11 raises the pan from the axis of rotation when dumping (the axis of rotation being the longitudinal axis of the axle which connects the wheels 16). This axle separating plate 11 is important to the dumping procedure in that it allows the wheelbarrow to rest on the wheelbarrow base plate 13 when dumping the pan 1 and insuring that the full load of material may be discharged from the pan conveniently and efficiently. The axle is secured to the main base rails by means of a pair of axle securing plates 14, as best shown on FIG. 1.

Figure 4:
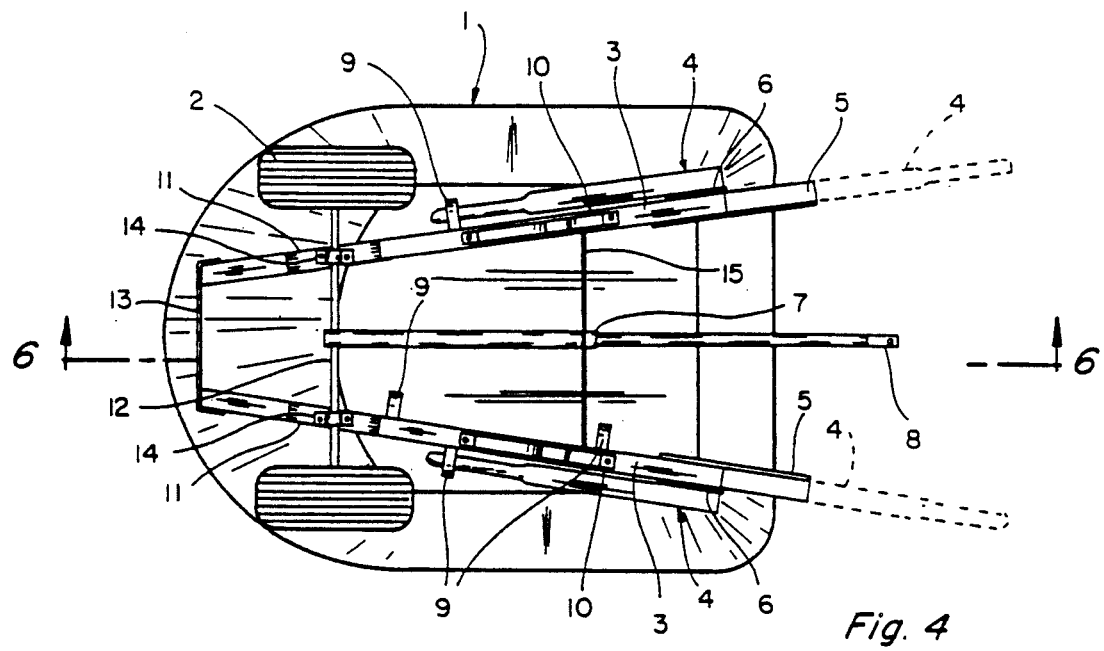
FIG. 4 is a bottom view of the wheelbarrow/trailer device shown with the arms in the retracted position.

In order to allow the conversion of the wheelbarrow to a garden trailer, a mainframe tow bar 7 is permanently affixed to the bottom of the wheelbarrow at two points. Surrounding the axle 12 is an axle housing. The mainframe tow bar 7 has one end permanently affixed to the axle housing and a second end permanently affixed to a mainframe tow bar brace 15, as shown on FIG. 1. The mainframe tow bar may be extended when the conversion of the wheelbarrow to a trailer is desired by means of a mainframe tow bar extension member 8. This mainframe tow bar extension member 8 is attached to one mainframe base rail 3 by means of C-shaped securing brackets 9. These C-shaped securing brackets have tension which biases the outer ends of the C-shaped brackets closed. The tow bar extension normally is secured to the base rail 3 when the device is used as a wheelbarrow. However, the tow bar extension 8 may be readily and easily detached from the base rail and attached to the mainframe tow bar upon conversion to a trailer. As best shown in FIG. 4, the mainframe tow bar extender 8 is inserted into the end of the mainframe tow bar 7 which is nearest to the mainframe tow bar brace 15. Corresponding holes through the tow bar 7 and the tow bar extension 8 allow a pin to be dropped therethrough, thus securing the extender to the mainframe tow bar, as shown in FIG. 4. The opposite end of the tow bar extender 8 has a convenient coupling therein for attaching the trailer to a tractor or riding lawn mower. The opposite attaching end of the extender 8 may be simply a hole, as shown on FIG. 4, or a device adapted to receive a towing ball.

When it is desired to dump the material contained in the pan 1, one simply tips the wheelbarrow up onto its base plate 13. Because the wheels and axle are separated from the mainframe base rails 3 by means of axle separating plates 11, this tipping action may be completed and the wheelbarrow may be turned and supported on the base plate 13.

Because the essential elements of the wheelbarrow and trailer consist of the wheelbarrow itself and one tow bar extender which is secured to a base rail, all of the parts necessary for converting the wheelbarrow to a trailer and back again are conveniently stored on the vehicle. The vehicle is light-weight, the preferred embodiment weighing approximately 38 pounds, yet is strong and durable due to the unique construction described herein. Since the unit is lightweight, a woman or child of appropriate age can easily handle the device. Since the device has two wheels, it is ideal for a one-armed person to use in gardening since it can be driven with one hand. The unit will not tip over since it is supported by two wheels and can be turned in a ninety degree angle in either direction by pivoting about one wheel or the other. When stored in an upright condition with the arms in the retracted position, as shown on FIG. 4, the wheelbarrow/trailer can be stored in a space of 30" by 36". It can be shipped assembled in a box which is approximately 31" by 37" by 13".

The wheelbarrow is not only a space saver, but it also can be easily and quickly interchanged from a wheelbarrow to a trailer in less than two minutes. It may be conveniently hooked up to a riding lawn mower or a tractor by the use of only one bolt. Since the wheels are separated from the main base rails and since the pan is separated from the main base rails by a wedge, dumping may be uniquely accomplished by turning the wheelbarrow on end onto its base plate 13.

Having fully described my invention, I claim:

1. A wheelbarrow/trailer device having a dumping end and a workman's end, comprising:
  (a) a fixed upper pan supported by a pair of lower wedges connected to said pan;
  (b) a pair of lower base rails, converging toward the dumping end of said device, connected to and underneath said wedges, wherein each base rail has a permanently but hingedly attached extension rail;
  (c) a pair of opposed wheels connected by an axle, said axle being attached to the bottom of the base rails by a pair of corresponding plates which separate said rails from said axle;
  (d) a central tow bar member fixedly attached to said wheelbarrow/trailer device;
  (e) a wheelbarrow/trailer base plate connecting the converging ends of said base rails;
  (f) a separate tow bar extender detachably connected to said tow bar member; and
  (g) a tow bar securing means for detachably securing said separate tow bar extender underneath said pan to one base rail;
  wherein in a first wheelbarrow configuration the base rails and extension rails are in an extended position and said tow bar extender is secured to said one base rail underneath the wheelbarrow pan, and in a second alternative trailer position said extension rails are folded back about hinges and said tow bar extender is attached to said tow bar member.

2. A wheelbarrow/trailer device as in claim 1, further comprising a pair of inner L-shaped braces, one brace being attached to the inside and top of each rail at the hinge.

3. A wheelbarrow/trailer device as in claim 1, further comprising a means for securing said extension rails to said base rails when in a folded position.

4. A wheelbarrow/trailer device as in claim 3, wherein said tow bar extender securing means comprises a C-shaped bracket.

5. A wheelbarrow/trailer device as in claim 3, wherein said hinged rail extension securing means comprises C-shaped securing brackets.

* * * * *